Nov. 18, 1941.  L. C. STRUENSEE ET AL  2,263,251
VEHICLE BRAKE MECHANISM
Filed July 19, 1940
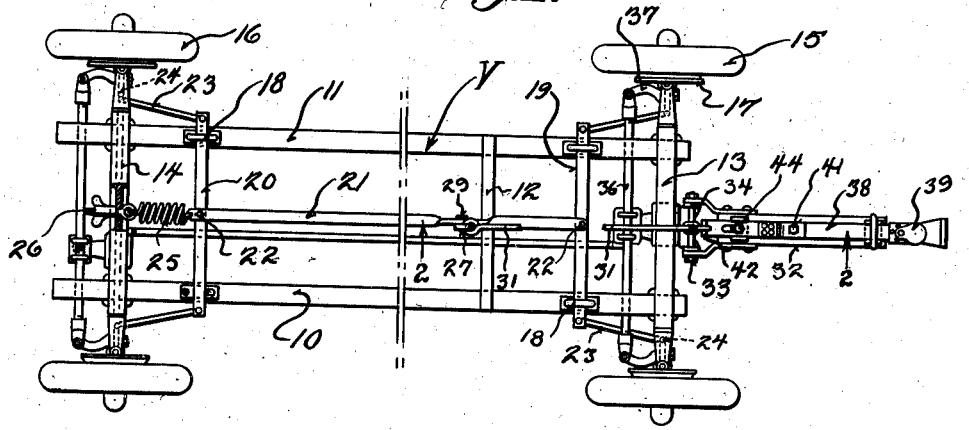

Patented Nov. 18, 1941

2,263,251

UNITED STATES PATENT OFFICE 2,263,251

VEHICLE BRAKE MECHANISM

Louis C. Struensee, Oshkosh, and Arthur E. Struensee, Fond du Lac, Wis.

Application July 19, 1940, Serial No. 346,348

4 Claims. (Cl. 188—168)

This invention appertains to vehicles, and more particularly to trailers or horse-drawn wagons and the like.

One of the primary objects of our invention is to provide a vehicle in which the brakes are automatically released when pull is exerted on the vehicle, and automatically applied when the pulling force ceases, whereby the overrunning of the vehicle on the pulling force, either by momentum or gravity, is prevented.

Another salient object of our invention is to provide spring or similarly urged equalizer brake bars for the front and rear brakes of a trailer, with novel means for connecting the bars together and to the draft animals or power pulling vehicle.

A further important object of our invention is the provision of means whereby the draft bar or tongue and the brake-operating member can swing in a horizontal or vertical plane without affecting the operation of the brakes in any way.

A still further object of our invention is to provide manually operable means for releasing the brakes so as to permit the free backing of the vehicle when necessary or desirable.

A still further object of our invention is the provision of means for operatively connecting the pull member with the brakes through the use of a leverage mechanism, whereby the brakes can be quickly and easily released as soon as initial pull is exerted on the vehicle.

With these and other objects in view, the invention consists in the novel construction, arrangement, and formation of parts, as will be hereinafter more specifically described, claimed, and illustrated in the accompanying drawing, in which drawing:

Figure 1 is a top plan view of a chassis of a vehicle constructed in accordance with our invention, parts of the view being shown broken away and in section.

Figure 2 is an enlarged, fragmentary, detail, longitudinal, sectional view through the vehicle, taken on the line 2—2 of Figure 1, looking in the direction of the arrows.

Figure 3 is an enlarged, fragmentary, top, plan view illustrating a modified form of our invention.

Figure 4 is an enlarged, fragmentary, detail, side, elevational view illustrating another form of our invention.

Figure 5 is a detail, fragmentary, plan view illustrating a modified form of guide for the pull or tension bar.

Referring to the drawing in detail, wherein similar reference characters designate corresponding parts throughout the several views, the letter V generally indicates a vehicle constructed in accordance with our invention, and the same includes a frame embodying spaced, parallel, longitudinally extending channel or like beams 10 and 11. The beams 10 and 11 can be connected together at desired spaced points by transversely extending brace bars 12, and the beams are further rigidly connected by front and rear axles 13 and 14. The terminals of the axles carry swinging wheel spindles for the front and rear wheels 15 and 16. The front and rear wheels 15 and 16 have connected therewith brakes 17, which can be of the drum-and-band type.

Slidably mounted in guides 18 on the beams 10 and 11 are front and rear brake equalizer bars 19 and 20. These guides 18 can be in the nature of U-bolts, and the same function to limit the sliding and swinging movement of the bars 19 and 20. These bars are operatively connected together by a longitudinally extending reach bar 21, and, as illustrated, the equalizer bars 19 and 20 are connected to the reach bar 21 by means of pivot pins 22. Hence, the equalizer bars are free to rock on the reach bar. Any preferred means can be utilized for operatively connecting the ends of the equalizer bars 19 and 20 with the adjacent wheel brakes, and, as shown, the ends of the equalizer bars 19 and 20 have pivotally connected thereto links 23, which are connected to operating cranks or the like 24 for the brakes.

Spring or other means is utilized for normally pulling the bars 19 and 20 rearwardly, so that the links 23 will operate to apply the brakes 17, and, thus, prevent free rotation of the wheels 15 and 16. The spring means can be of any preferred character or arrangement, and, for the purpose of illustration, we have shown a single, relatively heavy, contractile coil spring 25 connected to the rear end of the reach bar 21 and to the rear axle 14. An adjustable bolt 26 can be employed for connecting the spring 25 to the rear axle, so that the tension of the spring can be adjusted within certain limits.

One of the means for operating the reach bar 21 is illustrated in Figures 1 and 2, and, as shown, this means includes a swinging lever 27 pivotally connected, as at 28, to the cross bar 12 of the vehicle frame. The lever, intermediate its ends, is pivotally connected, as at 29, to the reach bar 21. The upper end of the lever 27 can be provided with a plurality of openings 30 into any selected one of which can be rockably fitted the pull link 31. The pull link 31 extends forwardly to the drawbar or tongue 32 of the vehicle, and this drawbar or tongue 32 is rockably mounted upon a horizontal pivot 33 carried by a bracket 34. This bracket 34 is, in turn, rotatably mounted on a vertically disposed kingbolt 35 carried by the front axle 13. By this construction, the drawbar or tongue 32 is free to swing up and down in a vertical plane and transversely in a horizontal plane. The bracket 34 is extended rearward of its pivot or kingbolt 35 and is attached to the drag or connecting link 36 of the steering gear. This drag or connecting link 36 is, in turn, pivotally connected to the wheel spindle cranks 37.

Slidably mounted upon the tongue or drawbar 32 is the tension or pull strap 38, and the front end of the strap carries a socket 39 for receiving a ball 40, which can, in turn, be carried by the pulling vehicle.

In cases where the vehicle is to be pulled by draft animals, the tongue or drawbar 32 can be extended, and the tension or pull strap 38 can be provided with a clip or the like 41 for receiving a doubletree. The rear end of the pull or tension strap 38 terminates in an upturned foot 42, and this foot is connected by means of a universal coupling 43 with the pull bar 31 for the brakes. The connection 43 allows the swinging movement of the tension or pull strap 38 in a vertical and horizontal plane without actuating the brakes. Movement of the pull or tension strap can be limited by a bolt 44 mounted on the tongue or draft bar 32, and this bolt can extend through a guide slot 45 formed in said tension or pull strap 38.

In use of our device, the brakes are normally pulled to an applied position by the spring 25, but it can be seen that as soon as pull is exerted on the strap 38, the lever 27 will be swung forwardly, which will actuate the reach bar 21 in a forward direction. This movement of the reach bar 21 will, in turn, actuate the equalizing bars 19 and 20, and, thus, bring about the release of the brakes.

When the vehicle tends to overrun the pulling member or animals for any reason, such as when the vehicle is going downhill, the pull on the strap 38 will cease, and the brakes will be automatically applied by the spring 25. The pull bar 31 can be set in any desired opening 30, as heretofore stated, so that the device can be set according to load conditions and draft conditions.

In lieu of providing the swinging lever 27, we can extend the reach bar 21 forwardly of the front equalizing bar 19, as shown in Figure 3, and provide an upstanding foot 46 thereon. This foot 46 can then be connected to the foot 42 of the pull or tension strap 38 by means of a universal coupling 47.

In backing the vehicle, it is also desirable to provide manual means for releasing the brakes, and this can be accomplished in different manners, one of which is shown in Figure 3. As illustrated in Figure 3, a hand lever 48 is pivotally connected, as at 49, to a cross bar 50 of the frame, and the lever is adapted to bear against an anti-friction roller 51 mounted on a stationary pin 52 rigidly carried by the reach bar 21. By swinging the hand lever 48 forwardly to the dotted-line position, the brakes can be moved to a released position against the tension of the spring 25.

In Figure 4, we have shown another form of means for connecting the pull or tension strap 38 with the draft appliance, and this pull or tension strap 38 can be pivotally connected to the upper end of a lever 53 rockably mounted intermediate its ends on a crosspin 54 carried by the front end of the drawbar 32. The lever, above the pivot 54, has connected thereto by means of a pivot 55 a clevis 56, and this clevis is connected by a vertical pin 57 with a pull head 59 rigidly secured to a draft vehicle. When pull is exerted on the upper end of the lever 53, the pull or tension strap 38 will be urged forwardly, and this movement will be transmitted to the reach bar 21 for applying the brakes.

Also, various means can be employed for guiding the pull or tension strap 38, and in Figure 5 we have shown a cylinder 60 rigidly connected to the draft bar 32. The tension rod or strap 38 passes through the cylinder and has formed thereon or secured thereto a piston 61, which is adapted to travel in the cylinder.

Various other changes in details can be made without departing from the spirit or the scope of our invention, but what we claim as new is:

1. A vehicle comprising, a frame, front and rear pairs of ground wheels on the frame, a brake and brake operating means for each wheel, a front and a rear equalizing bar on the frame, a reach bar pivotally connected to the central portions of the equalizing bars, means operatively connecting the outer ends of the equalizing bars to the operating means for the adjacent brakes, means normally urging the reach bar and the equalizing bars to a brake-applying position, a draft tongue pivotally connected to the front end of the frame, a tension strap slidably mounted on the tongue, means operatively connecting the tension strap to a draft device, and means operatively connecting the rear end of the tension strap to the reach bar.

2. A vehicle comprising, a frame, front steering wheels for the frame, a link connecting the wheels together, brakes for said wheels, an equalizing bar on the frame, an operating bar pivotally connected to the central portion of the equalizing bar, a bracket mounted for swinging movement in a horizontal plane, a draft tongue pivotally mounted on the bracket for swinging movement in a vertical plane, a tension bar, means for connecting the tension bar to a draft appliance, means operatively connecting the tension bar to the operating bar, said means including a universal coupling, whereby to permit free swinging movement of the tension bar in a vertical and horizontal plane without actuating the operating bar, and means normally urging the brakes to an applied position.

3. A vehicle comprising, a frame, front and rear axles on the frame, front and rear pairs of wheels for the axles, brakes for the wheels, equalizing bars slidably mounted on the frame, a reach rod pivotally connected to the equalizing bars at the central portions thereof, means operatively connecting the equalizing bars to the brakes, means normally urging the equalizing bars and the reach bar to a brake-applying position, a lever rockably mounted at its lower end on the frame, means pivotally connecting the lever intermediate its ends to the reach bar, a draft tongue pivotally connected to the front axle, a tension strap slidably mounted on the tongue, means for connecting the front end of the connecting strap to a draft device, and means including a pivotal connection for operatively uniting the tension strap to the upper end of the lever.

4. A vehicle comprising, a frame, front and rear pairs of ground wheels on the frame, a brake and brake operating means for each wheel, a front and a rear equalizing bar on the frame, a reach bar pivotally connected to the central portions of the equalizing bars, means operatively connecting the outer ends of the equalizing bars to the operating means for the adjacent brakes, means normally urging the reach bar and the equalizing bars to a brake-applying position, a draft tongue pivotally connected to the front end of the frame, a tension strap slidably mounted on the tongue, means operatively connecting the tension strap to a draft device, means operatively connecting the rear end of the tension strap to the reach bar, and a manually operable lever for actuating the reach rod.

LOUIS C. STRUENSEE.
ARTHUR E. STRUENSEE.